(12) United States Patent
Lee et al.

(10) Patent No.: US 7,869,710 B2
(45) Date of Patent: Jan. 11, 2011

(54) OPTICAL NETWORK UNIT OF ETHERNET PASSIVE OPTICAL NETWORK AND CONTROL METHOD THEREOF

(75) Inventors: Hong-Gi Lee, Yongin-si (KR); Ho-Jun Keum, Anyang-si (KR); Jae-Hwang Ryu, Suwon-si (KR); Soon-Ho Jang, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 698 days.

(21) Appl. No.: 11/893,267

(22) Filed: Aug. 15, 2007

(65) Prior Publication Data

US 2008/0044185 A1 Feb. 21, 2008

(30) Foreign Application Priority Data

Aug. 17, 2006 (KR) ............... 10-2006-0077576

(51) Int. Cl.
*H04J 14/08* (2006.01)
(52) U.S. Cl. ........................... 398/33; 398/98
(58) Field of Classification Search ........... 398/98–100, 398/33
See application file for complete search history.

(56) References Cited

U.S. PATENT DOCUMENTS 7,424,221 B2 * 9/2008 Emery et al. .............. 398/38

2004/0196862 A1 * 10/2004 Song et al. ............... 370/442
2007/0116467 A1 * 5/2007 Kwon et al. ............... 398/72
2007/0280153 A1 * 12/2007 Sinha ..................... 370/328
2008/0166119 A1 * 7/2008 Ryu et al. ................. 398/17

FOREIGN PATENT DOCUMENTS

| KR | 2006-13924 | 2/2006 |
| KR | 2006-49970 | 5/2006 |

* cited by examiner

*Primary Examiner*—Leslie Pascal
(74) *Attorney, Agent, or Firm*—Cha & Reiter, LLC

(57) ABSTRACT

An optical network unit (ONU) of an Ethernet passive optical network (EPON) and a control method thereof eliminates or substantially reduces instances of an ONU transmitting in time slots other than its allocated time slot. The ONU includes: a medium access controller for accessing a medium without temporal overlapping in order to transmit during one or more allocated TDM time slots without collision in upstream transmission to an optical line terminal; a burst-mode optical transceiver having a separately allocated wavelength before outputting the signal in the upstream transmission; and a complex programmable logic device for controlling an optical output of the burst-mode optical transceiver by monitoring an optical-output control signal from the medium access controller. An erroneous output from an ONU malfunction can be prevented from by cutting off the output once the duration of the allocated time slot has been reached.

19 Claims, 4 Drawing Sheets

OPTICAL NETWORK UNIT OF ETHERNET PASSIVE OPTICAL NETWORK AND CONTROL METHOD THEREOF

CLAIM OF PRIORITY

This application claims the benefit of priority under 35 U.S.C. §119 (a) from an application entitled "Optical Network Unit Of Ethernet Passive Optical Network And Control Method Thereof," filed with the Korean Intellectual Property Office on Aug. 17, 2006 and assigned Ser. No. 2006-77576, the contents of which are incorporated herein by reference in its entirety.

BACKGROUND OF THE INVENTION

1. Field of the Invention

The present invention relates to an optical network unit of an Ethernet passive optical network and a control method thereof. More particularly, the present invention relates to an optical network unit of an Ethernet Passive Optical Network (EPON) that monitors optical-output control signals in upstream transmission so as to prevent a malfunction thereof in advance. In addition, the present invention relates to an optical network unit of an EPON that prevents influences from being exerted on other optical network units operating normally when an abnormal operation occurs, and a control method of the optical network unit in an EPON.

2. Description of the Related Art

At present, Asymmetric Digital Subscriber Line (ADSL) and cable modem systems are the most widely used for high-speed Internet services. The ADSL system uses existing telephone lines, and provides high-speed Internet services with speeds between 2 Mbps and 10 Mbps through the ADSL modem installed in each subscriber's computer. Users typically install filters on the telephone line immediately prior to entry into a telephone, to filter the noise from ADSL traffic that can adversely affect operation telephones, faxes, etc.

On the other hand, cable modems use existing coaxial cables installed for cable TV services in order to provide high-speed Internet services, so a subscriber must install a cable modem within the area of his/her PC when already subscribing to cable TV service in order to be provided with the high-speed Internet services, or would have to purchase additional equipment, such as a wireless router that receives an output of the cable modem, and install a wireless network card into their pc. Otherwise, coaxial cables output from the modem would have to be run throughout one's house, which is unsightly and labor intensive.

These high-speed Internet services are satisfactory in performance in providing services such as Internet web surfing (HTTP), E-mail, file transfer (FTP), etc. with much higher transmission capacity of 2 to 10 Mbps, as compared with the existing telephone line modem having a speed of 56 Kbps, but they still have a limitation in meeting the users' emerging requirements such as VoIP (Voice over Internet Protocol), VoD (Video on Demand), Internet broadcasting service, etc.

Moreover, high-speed Internet service using the cable modem has a disadvantage in that the bandwidth which can be provided decreases as the number of subscribers increases, and the high-speed Internet service using the ADSL scheme has a disadvantage in that the bandwidth which can be provided decreases as the distance between a telephone office and a subscriber network increases. Also ADSL has problems associated with adverse weather conditions, for example, many subscribers to ADSL are aware that during a thunderstorm it is not unusual for the ADSL connection to be interrupted.

In an attempt to solve these problems, there have been proposed FTTH (Fiber To The Home), FTTB (Fiber To The Building), FTTC (Fiber To The Curb), etc., in which optical cables are installed to the subscriber's in-home network. In addition, studies are being conducted about an Ethernet passive optical network (E-PON) for the sake of enhancing the price-to-service ratio.

More particularly, the E-PON is an Ethernet-associated network which is constructed with passive elements without using power-consuming active elements in the optical subscriber network, so as to enhance its price competitiveness. The standard for the E-PON is being established by the IEEE (Institute of Electrical and Electronics Engineers) 802.3ah Ethernet in the first Mile Task Force. An example of the E-PON is illustrated in FIGS. 1A and 1B and discussed herein below.

FIGS. 1A and 1B are block diagrams illustrating respective flows of upstream and downstream traffic in a conventional E-PON. It can be seen from FIG. 1A that an E-PON has a point-to-multipoint structure in which a plurality of Optical Network Units (ONUs) 20-1 to 20-3, etc., are connected to one Optical Line Terminal (OLT) port 10 through a splitter 30, which is a passive element. Data transference between the OLT 10 and ONUs 20 is performed in units of an Ethernet frame. For example, downstream signals from the OLT 10 to the ONUs 20 are transmitted as broadcasting data, and upstream signals from the ONUs 20 to the OLT 10 share bandwidths allocated to the ONUs 20 by the Time Division Multiple Access (TDMA) scheme.

Therefore, still referring to FIGS. 1A and 1B, upon transmitting upstream signals to the OLT 10, when the conventional ONUs 20 are granted by the OLT 10 so as to collide between each other in a burst mode scheme, the ONUs 20 will transmit IDLE data (data for clock recovery time and code group arrangement in the OLT) to the OLT 10, and then transmit corresponding data as upstream frames in the TDMA scheme.

More particularly, each ONU 20-1, 20-2 and 20-3 transmits frames upstream to the OLT 10 in the TDMA scheme. Each ONU 20-1, 20-2 and 20-3 is allocated with a time period (time slot) from the OLT 10, and the individual ONU can transmit a corresponding frame only during the time period (time slot) allocated, as other time slots are allocated to other ONUs, etc. Upon an upstream transmission, when the on/off control of a laser diode is operating in a normal state, the individual ONUs do not transmit outside (beyond) their allocated time slot. However, when the on/off control of the laser is not properly performed due to a malfunction of a particular ONU (such as 20-2), abnormal data is transmitted in excess of a preset time period.

The extended transmission beyond the respect duration of the time slot by the malfunctioning ONU exerts an influence upon time periods allocated to the other ONUs 20-1 and 20-3 such that the other ONUs 20-1 and 20-3 recognize that the malfunctioning ONU 20-2 is continuously occupying the transmission line, thereby causing a serious error in data transmitted in the upstream direction.

While ONU #1 20-1 successfully transmits an ONU #1 data frame during a preset time, that is, during a first time period, ONU #2 20-2 cannot transmit ONU #2 data within a second time period due to an error occurring in ONU #2 and occupies the transmission line, even after the second time period has elapsed. That is, ONU #2 20-2 continuously transmits the erroneous ONU #2 data in excess of a preset time period, so that data collision occurs in a third time period during which the ONU #3 20-3 must be transmitting ONU #3 data, and such data collision continuously occurs, thereby causing the overall Gigabit E-PON to be unable to transmit data normally. If the malfunctioning ONU#2 20-2 continues to transmit beyond the allocated time slot, the data collisions can slow down or essentially impair the communication capability of the other ONUs that are not malfunctioning.

SUMMARY OF THE INVENTION

Accordingly, the present invention has been made in part to solve at least some of the above-mentioned problems occurring in the prior art. The present invention provides an optical network unit and a control method thereof, which monitor optical-output control signals upon an upstream transmission in an Ethernet Passive Optical Network (EPON) so as to prevent malfunction of the optical network unit in advance upon occurrence of an abnormal operation by one of the components, such as an Optical Network Unit (ONU).

Also, the present invention provides an ONU and a control method thereof, which can prevent influences from being exerted on other ONUs operating normally when an abnormal operation occurs in an EPON.

In accordance with an exemplary aspect of the present invention, there is provided an ONU in an E-PON using a time division multiplexing (TDM) scheme, the optical network unit including: a medium access controller for accessing a medium without temporal overlapping. This medium access controller thus functions to transmit during one or more allocated TDM time slots without collision in upstream transmission to an optical line terminal; a burst-mode optical transceiver for converting a signal transferred from the medium access controller into an optical signal having a separately allocated wavelength before outputting the signal in the upstream transmission; and a complex programmable logic device for controlling an optical output of the burst-mode optical transceiver by monitoring an optical-output control signal from the medium access controller.

In accordance with another exemplary aspect of the present invention, there is provided a control method of an ONU in an E-PON using a time division multiplexing (TDM) scheme, the method including the steps of: determining whether there is an optical-output control signal being output in upstream transmission to an optical line terminal, and detecting an output time period of the optical-output control signal; comparing the detected output time period with a preset monitoring time period; determining that the optical-output control signal is abnormal when it is determined that the detected output time period is greater than the monitoring time period as a result of the comparison; and cutting off an optical output of the optical network unit as the optical-output control signal has been determined to be abnormal.

BRIEF DESCRIPTION OF THE DRAWINGS

The above and other exemplary aspects, features and advantages of the present invention will be more apparent from the following detailed description taken in conjunction with the accompanying drawings, in which.

DETAILED DESCRIPTION OF THE INVENTION

Hereinafter, an exemplary embodiment of the present invention will be described with reference to the accompanying drawings. In the following description, a detailed description of known functions and configurations incorporated herein may be omitted when it may obscure appreciation of the subject matter of the present invention by a person of ordinary skill in the art. It is understood by an artisan that the drawings and explanation have been provided for explanatory and illustrative purposes and the invention is not limited to the descriptions shown and described.

Figure 1A:
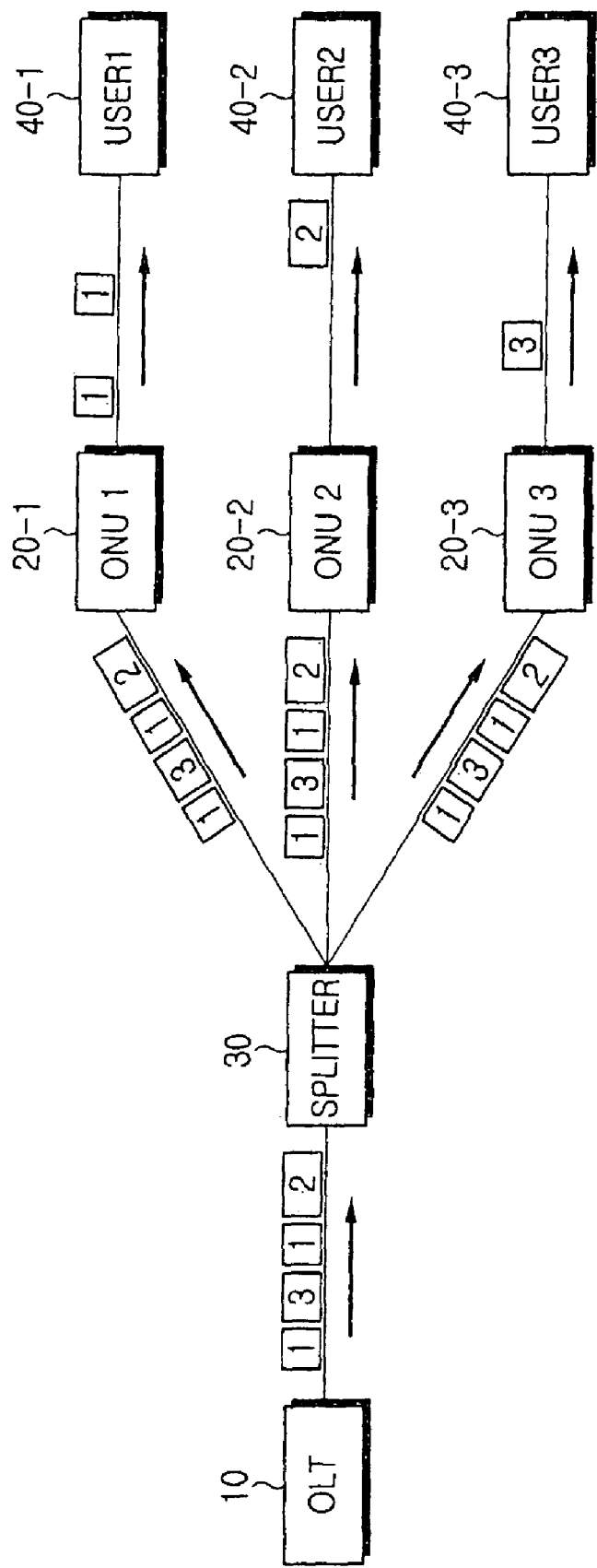
FIG. 1A is a view illustrating flows of downstream traffic in the conventional system.
Figure 1B:
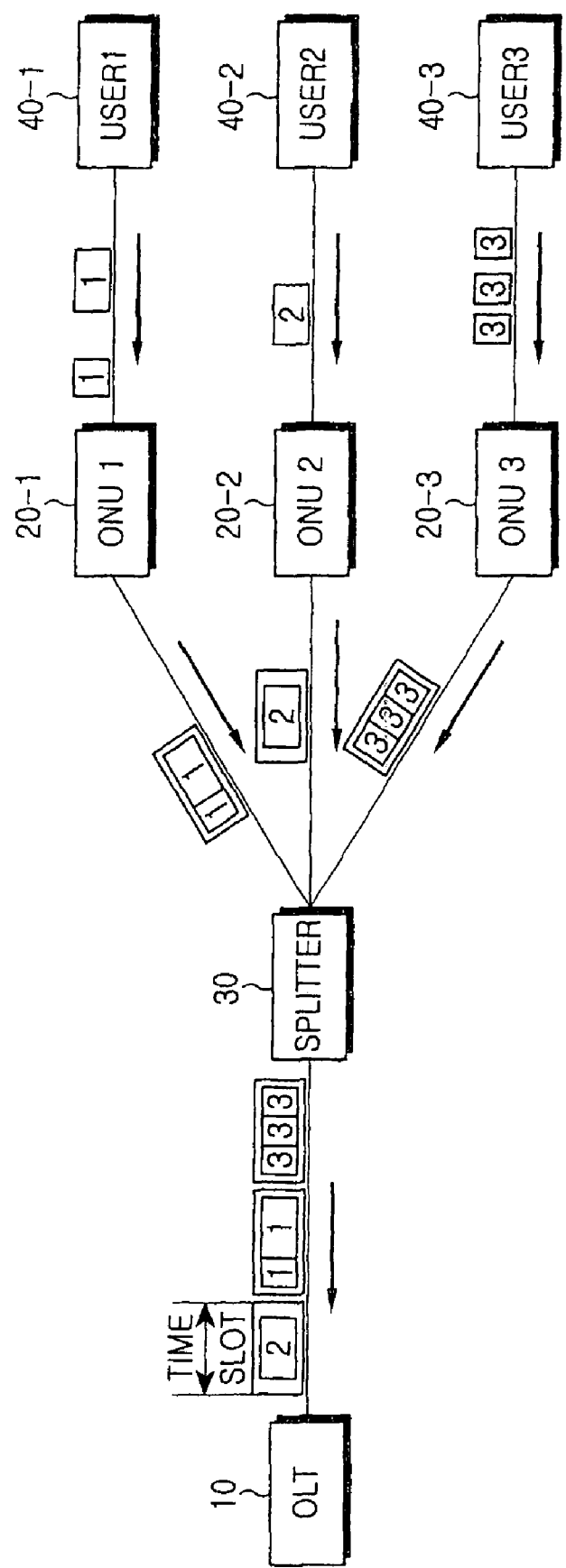
FIG. 1B is a view illustrating flows of upstream traffic in the conventional system.

First, the configuration of an E-PON using the Time Division Multiple Access (TDMA) scheme, to which the present invention is applied, can have a network configuration as shown in the conventional examples in FIGS. 1A and 1B. Accordingly, the description of the E-PON to which the present invention is applied, will continue to refer to the configuration having the OLT 10, a plurality of ONUs 20-1 to 20-3 connected with the OLT 10, and optional connection with a plurality of end users (user network apparatuses) 40-1 to 40-3. However, a person of ordinary skill in the art understands and appreciates that the EPON can have a number of different and sometime more complex configurations than shown and the invention is applicable to these other configurations as well.

The pieces of data transmitted by the end users 40-1 to 40-3 are transferred to the OLT 10 via the ONUs 20-1 to 20-3, and the pieces of data transmitted by the OLT 10 are transferred to the end users 40-1 to 40-3 via the ONUs 20-1 to 20-3.

With regard to transmission in a typical E-PON, such data, i.e., Ethernet frames are transmitted at a transmission speed greater than 1 Gbps. Upon an upstream transmission, the OLT 10 accesses data of the ONUs 20-1 to 20-3 multiplexed in the time division multiplexing (TDM) scheme. Also, upon a downstream transmission, each ONU 20-1 to 20-3 selects and receives only data which should be received by the ONU, from among data broadcasted by the OLT 10.

Figure 2:
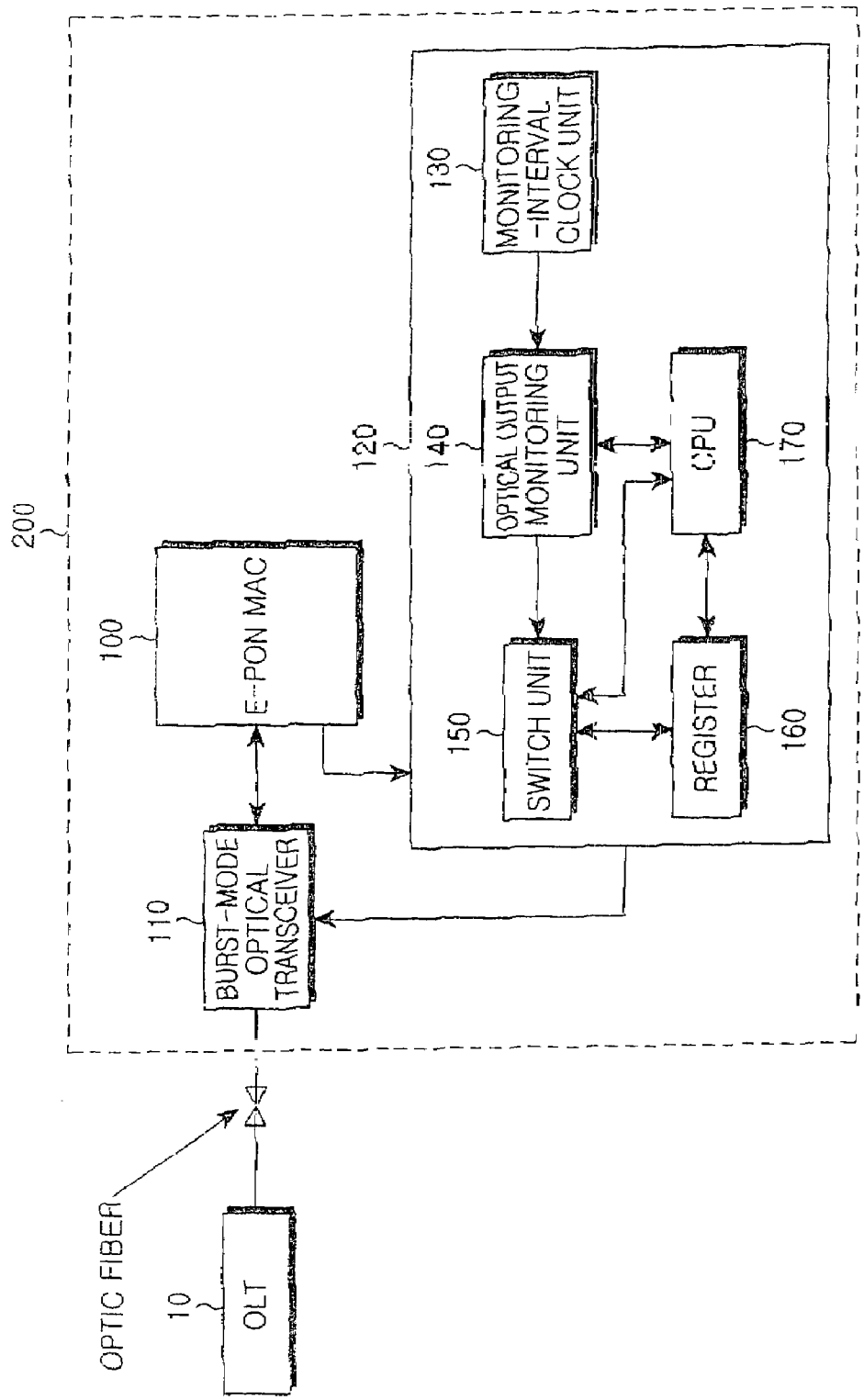
FIG. 2 is a block diagram illustrating the configuration of an optical network unit (ONU) of an Ethernet passive optical network (E-PON) operating under a time division multiplexing scheme according to an exemplary embodiment of the present invention.

FIG. 2 is a block diagram illustrating an exemplary configuration of an ONU 200 in an E-PON using the TDM scheme according to an exemplary embodiment of the present invention.

Still referring to FIG. 2, an ONU 200 of an E-PON using the TDM scheme according to an exemplary embodiment of the present invention includes an E-PON medium access controller (E-PON MAC) 100, a burst-mode optical transceiver 110, and a complex programmable logic device (CPLD) 120.

The E-PON MAC 100 has a Time Division Multiple Access Medium Access Control Protocol (TDMA MAC) for accessing a medium without temporal overlapping in order to transmit during one or more allocated TDM time slots without collision in upstream transmission to the OLT 10.

The burst-mode optical transceiver 110 converts a signal transferred from the E-PON MAC 100 into an optical signal having a separately allocated wavelength before outputting the signal in upstream transmission.

The CPLD 120 monitors optical-output control signals output from the E-PON MAC 100, and controls an optical output of the burst-mode optical transceiver 110 according to the optical-output control signal.

The CPLD 120 includes a monitoring-interval clock unit 130, an optical output monitoring unit 140, a switch unit 150, a register 160 and a central processing unit (CPU) 170.

The monitoring-interval clock unit 130 outputs a clock having a monitoring interval preset by a system operator.

The optical output monitoring and control unit 140 measures an elapsed time of a time period from when the output of an optical-output control signal starts from the E-PON MAC 100, and determines whether a duration of the optical-output control signal is normal or abnormal by comparing the elapsed time with a monitoring time period according to a clock output by the monitoring-interval clock unit 130. The optical output monitoring unit 140 performs a control function by outputting an optical-output control signal according to a result of the determination to the switch unit 150.

Still referring to FIG. 2, the switch unit 150 is turned on/off according to the optical-output control signal being transferred from the optical output monitoring unit 140 so as to control an optical output of the burst-mode optical transceiver 110. In other words, turning on the switch unit 150 corresponds to continuing the optical output of the burst-mode optical transceiver 110, and turning off the switch unit 150 corresponds to cutting off the optical output of the burst-mode optical transceiver 110.

The register 160 stores a status indicating whether a duration of an optical-output control signal is normal or abnormal, which has been determined by the optical output monitoring unit 140. The register 160 stores normal/abnormal determination signals, which are read under the control of the central processing unit 170. Note that inventive step involves determining whether the duration of the optical output control signal is abnormal, as opposed to some other measurement regarding the output control signal (phase, intensity, etc) to indicate there is a problem. In other words, so long as the signal has a duration within the allocated timeslot, it is always considered normal.

The central processing unit 170 receives a normal/abnormal determination signal from the optical output monitoring unit 140, and outputs a control signal for representing a normal/abnormal durational status of the optical-output control signal in accordance with the received normal/abnormal determination signal.

As described above with reference to FIG. 2, according to an exemplary embodiment of the present invention, the CPLD 120 outputs a clock for determining a monitoring interval. The optical output monitoring unit 140, which determines whether an optical-output control signal output from the E-PON MAC 100 is normal or abnormal in duration, detects an optical-output control signal at a monitoring interval and stores information regarding whether the detected optical-output control signal is normal or abnormal in the n-bit register 160. The central processing unit 170 reads what numbered bit of n bits stores an abnormal signal, and then generates a signal informing the OLT 10 that an error has occurred in the optical-output control signal corresponding to the bit storing the abnormal signal. For example, the central processing unit 170 may generate a control signal to flicker a light-emitting diode (LED). Note that the OLT 10 does the CPU 170 in the CPLD of the ONU to inform about the error.

According to an exemplary embodiment of the present invention, an optical-output control signal output from the E-PON MAC 100 is input to the CPLD 120, and the optical-output control signal is monitored in a predetermined sequence at regular intervals. Thus, when a signal representing an abnormal durational state is defined as "High," the central processing unit 170 reads what numbered bit is "High" in the n-bit register, and informs the OLT 10 that an error occurs in the optical-output control signal corresponding to the bit defined as "High."

Figure 3:
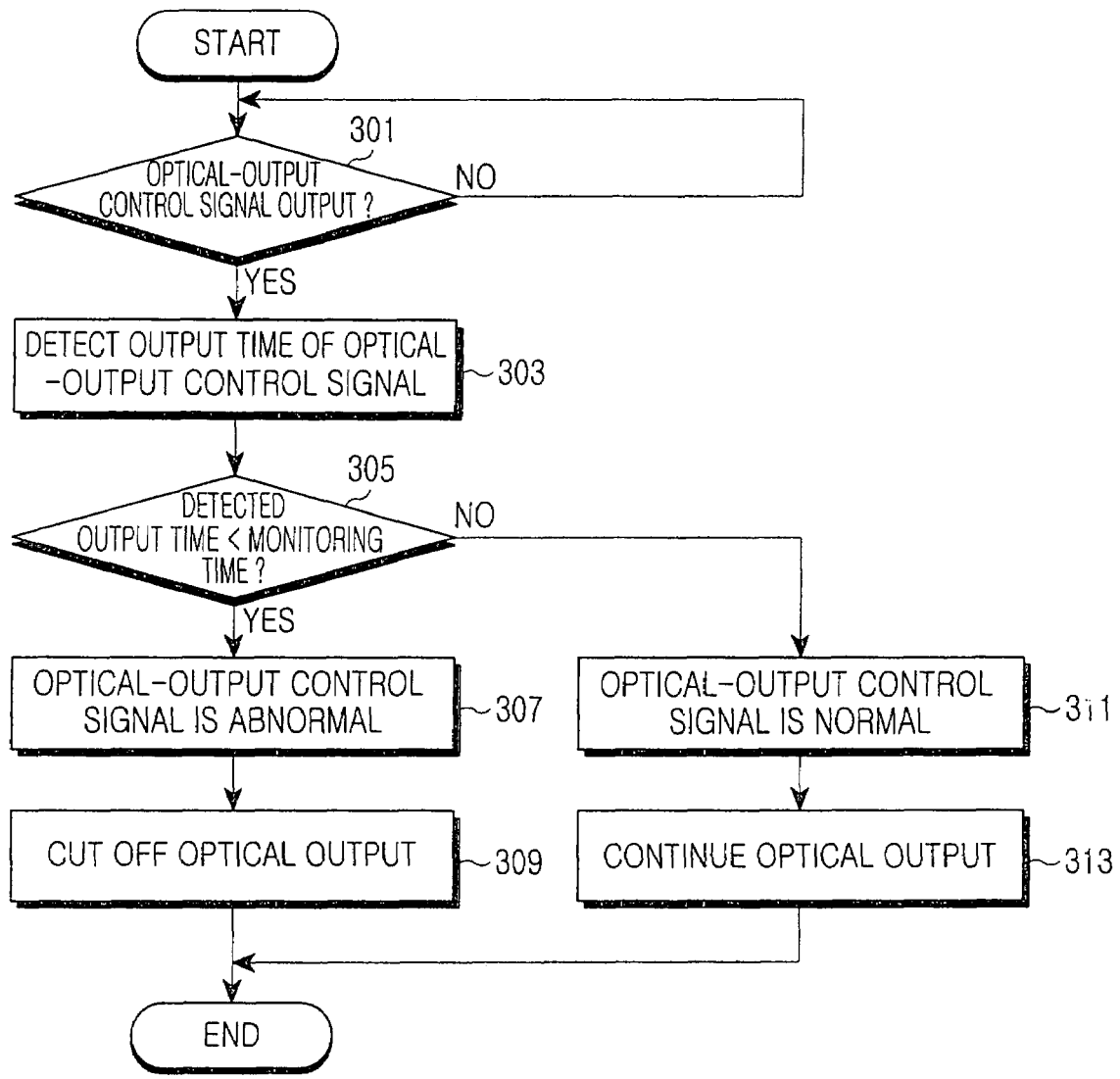
FIG. 3 is a flowchart illustrating exemplary operational steps of the complex programmable logic device according to an exemplary embodiment of the present invention.

FIG. 3 is a flowchart illustrating exemplary operational steps of the CPLD 120 according to an exemplary embodiment of the present invention.

In step 301, the CPLD 120 determines whether there is an optical-output control signal output to the burst-mode optical transceiver 110, and proceeds to step 303 when there is an optical-output control signal output to the burst-mode optical transceiver 110. In step 303, the optical output monitoring unit 140 detects an elapsed time from when the output of the optical-output control signal starts, and proceeds to step 305.

In step 305, the optical output monitoring unit 140 compares the duration of an output time period detected in step 303 with a preset monitoring time period. As a result of the comparison, when the detected output time period is greater than the preset monitoring time period, step 307 is performed, and when the detected output time period is smaller than the monitoring time period, step 311 is performed.

In step 307, it is determined that the optical-output control signal is abnormal because the detected output time period is greater than the monitoring time period, which means that an error may occur in the burst-mode optical transceiver 110. In step 311, it is determined that the optical-output control signal is normal because the detected output time period is smaller than the monitoring time period, which means that the optical output of the burst-mode optical transceiver 110 is being properly performed.

In addition, when it is determined that the optical-output control signal is abnormal, the CPLD 120 controls the switch unit 150 to be turned off so as to fully cut off the optical output of the burst-mode optical transceiver 110 in step 309 in order to prevent subsequent data collisions with other ONUs. In contrast, when it is determined that the optical-output control signal is normal, the CPLD 120 controls the switch unit 150 to be in an ON state so that the burst-mode optical transceiver 110 can continue the optical output.

Accordingly, in the E-PON using the TDMA scheme, the ONU 20 monitors an optical-output control signal so as to detect the occurrence of an abnormal operation in upstream transmission, thereby preventing the ONU 20 from causing a malfunction that can impact the network, and preventing the malfunction of the ONU 20 from exerting influences upon other ONUs operating normally.

According to the present invention as described above, an ONU in the E-PON can be prevented from malfunctioning in advance when an abnormal operation occurs by monitoring an optical-output control signal in upstream transmission, and can prevent the malfunction of the ONU from exerting influences upon other ONUs operating normally.

While the present invention has been shown and described with reference to a certain exemplary embodiment thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof. For example, while the duration of the output signal is being monitored and controlled by being cut off, there are other features regarding transmission that can be the basis for cutting off an output signal, all of which lie within the spirit of the invention and the scope of the appended claims. The CPLD can be configured for monitoring whether the allocated time slot corresponds to the time the optical-output control signal is on, so if the burst mode transceiver is receiving a signal at an incorrect time slot as compared to the allocated time slot, the control signal can also be cut off.

What is claimed is:

1. An optical network unit (ONU) in an Ethernet passive optical network (E-PON) that communicates at least upstream via a time division multiplexing (TDM) scheme, the optical network unit comprising:
   a medium access controller for accessing a medium without temporal overlapping in order to transmit to an optical line terminal (OLT) during one or more allocated TDM time slots without having a data collision occur with transmissions from other ONUs in upstream transmission;
   a burst-mode optical transceiver for converting a signal transferred from the medium access controller into an optical signal before outputting the signal in the upstream transmission; and
   a complex programmable logic device (CPLD) for controlling an optical output of the burst-mode optical transceiver by monitoring an optical-output control signal from the medium access controller,
   wherein the CPLD detects the optical-output control signal from the medium access controller at monitoring intervals and sequentially stores information regarding whether the optical-output control signal is normal or abnormal at each monitoring interval in a register, and each bit of the register indicates whether the optical-output control signal is normal or abnormal at a corresponding monitoring interval.

2. The optical network according to claim 1, wherein the CPLD is configured for monitoring a duration of the optical-output control signal.

3. The optical network according to claim 2, wherein the CPLD compares a monitored duration of the optical-output control signal with an allocated time slot stored in the ONU.

4. The optical network according to claim 3, wherein the CPLD is configured for monitoring whether the allocated time slot corresponds to the time the optical-output control signal is on.

5. The optical network unit according to claim 1, wherein the complex programmable logic device comprises:
   a monitoring-interval clock unit for providing a clock output of a monitoring interval preset using the time division multiplexing scheme;
   an optical output monitoring unit for measuring an elapsed time from when an output of an optical-output control signal starts from the medium access controller, and determining whether the optical-output control signal is normal or abnormal by comparing the elapsed time with a monitoring time period according to a clock output by the monitoring-interval clock unit; and
   a switch unit which is turned on/off according to a result of the determination of the optical output monitoring unit so as to control an optical output of the burst-mode optical transceiver.

6. The optical network unit according to claim 5, wherein the switch unit is controlled to be ON according to a normal optical-output control signal, so as to continuously output an optical output of the burst-mode optical transceiver, and is controlled to be OFF according to an abnormal optical-output control signal, so as to cut off an optical output of the burst-mode optical transceiver.

7. The optical network unit according to claim 5, wherein the complex programmable logic device further comprises:
   the register for storing a status indicating whether an optical-output control signal is normal or abnormal, determined by the optical output monitoring unit; and
   a central processing unit for receiving a normal/abnormal determination signal from the optical output monitoring unit, and outputting a control signal for representing a normal/abnormal state of an optical-output control signal in accordance with the received normal/abnormal determination signal.

8. The optical network according to claim 7, wherein the central processing unit generates a signal used to notify the OLT that said error has occurred.

9. The optical network unit according to claim 1, wherein the ONU is configured for send/receiving communications from a user.

10. The optical network according to claim 1, wherein the CPLD notifies the OLT that an error has occurred.

11. A control method of an optical network unit (ONU) in an Ethernet passive optical network (E-PON) using a time division multiplexing (TDM) scheme, the method comprising the steps of:
    determining whether an optical-output control signal is being output in upstream transmission to an optical line terminal, and detecting an output time period of the optical-output control signal;
    comparing a duration of the detected output time period with a preset monitoring time period;
    determining that the optical-output control signal is abnormal when it is determined that the detected output time period is greater than the monitoring time period as a result of the comparison; and
    cutting off an optical output of the optical network unit as the optical-output control signal has been determined to be abnormal, wherein the optical-output control signal is detected at monitoring intervals, information regarding whether the optical-output control signal is normal or abnormal at each monitoring interval is sequentially stored in a register, and each bit of the register indicates whether the optical-output control signal is normal or abnormal at a corresponding monitoring interval.

12. The method as claimed in claim 11, further comprising the steps of determining that the optical-output control signal is normal when it is determined that the detected output time period is smaller than the monitoring time period as a result of the comparison; and
    maintaining an optical output of the optical network unit as the optical-output control signal has been determined to be normal.

13. An Ethernet Passive Optical Network (EPON) comprising:
    an Optical Line Terminal (OLT) that sends/receives information from a central office;
    a plurality of optical network units (ONUs) that communicates at least upstream with the OLT via a time division multiplexing (TDM) scheme, at least one ONU of the plurality of ONUs comprising:
    a medium access controller for accessing a medium without temporal overlapping in order to transmit to the OLT during one or more allocated TDM time slots without having a data collision occur with transmissions from one or more ONUs of said plurality of ONUs during an upstream transmission;
    a burst-mode optical transceiver for converting a signal transferred from the medium access controller into an optical signal before outputting the signal in the upstream transmission; and a complex programmable logic device (CPLD) for controlling an optical output of the burst-mode optical transceiver by monitoring an optical-output control signal from the medium access controller;

wherein the CPLD detects the optical-output control signal from the medium access controller at monitoring intervals and sequentially stores information regarding whether the optical-output control signal is normal or abnormal at each monitoring interval in a register, and each bit of the register indicates whether the optical-output control signal is normal or abnormal at a corresponding monitoring interval.

14. The EPON according to claim 13, wherein said at least one ONU being configured for send/receiving communications from a user.

15. The EPON according to claim 13, wherein the CPLD is configured for monitoring a duration of the optical-output control signal.

16. The EPON according to claim 13, wherein the CPLD compares a monitored duration of the optical output control signal with an allocated time slot stored in the ONU.

17. The EPON according to claim 13, wherein the CPLD is configured for monitoring whether the allocated time slot corresponds to the time the optical-output control signal is on.

18. The EPON according to claim 13, wherein the CPLD notifies the OLT that an error has occurred.

19. The EPON according to claim 18, wherein the CPLD includes a central processing unit for receiving a normal/abnormal determination signal from an optical output monitoring unit, and said CPU outputting a control signal for representing a normal/abnormal state of an optical-output control signal in accordance with the received normal/abnormal determination signal, and for generating the signal used to notify the OLT that said error has occurred.

* * * * *